March 23, 1965 R. J. HAGEL 3,174,248
ARTIFICIAL FISH LURE
Filed June 11, 1963 2 Sheets-Sheet 1
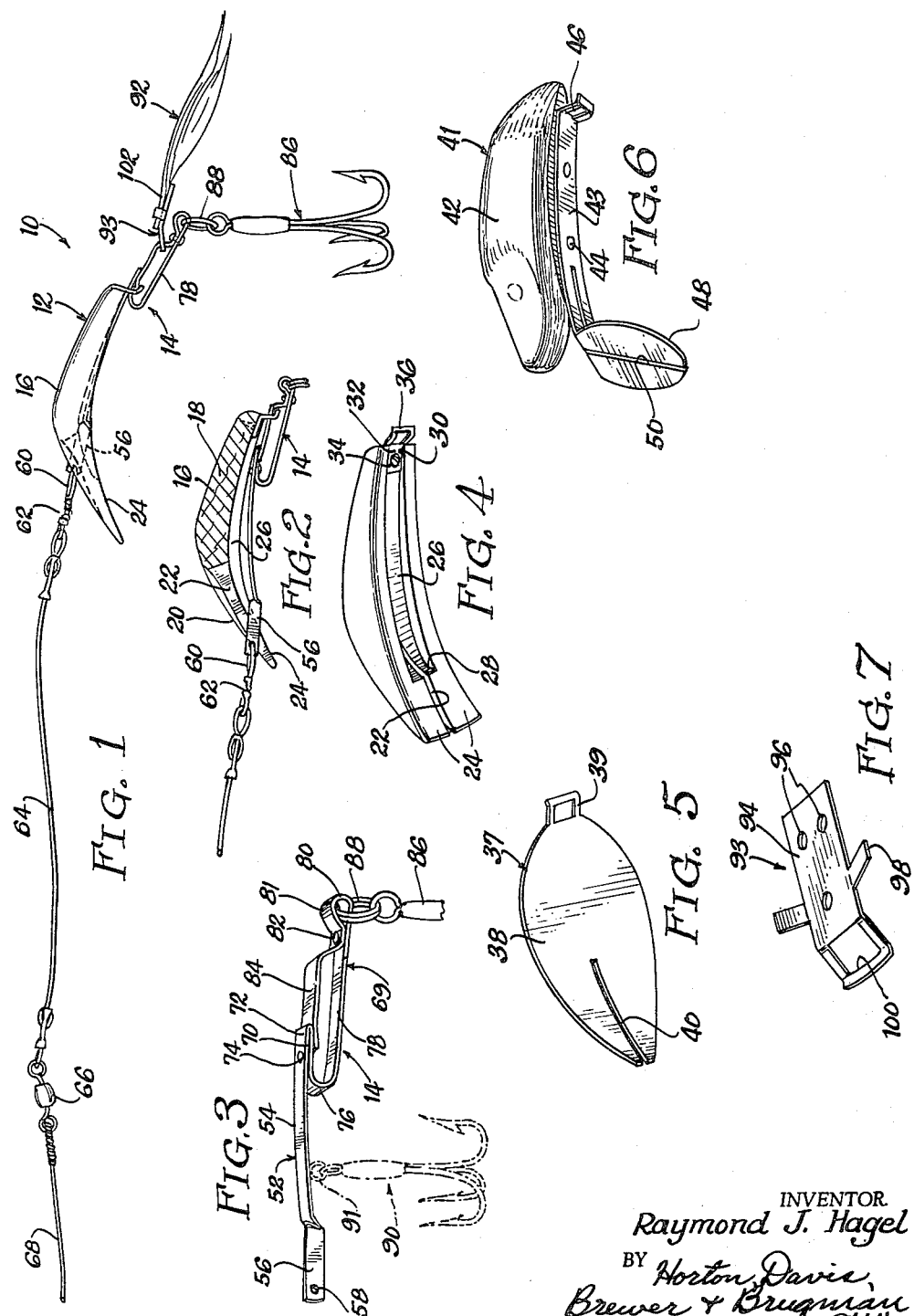
INVENTOR.
Raymond J. Hagel
BY Horton Davis,
Brewer & Brugman
Att'ys

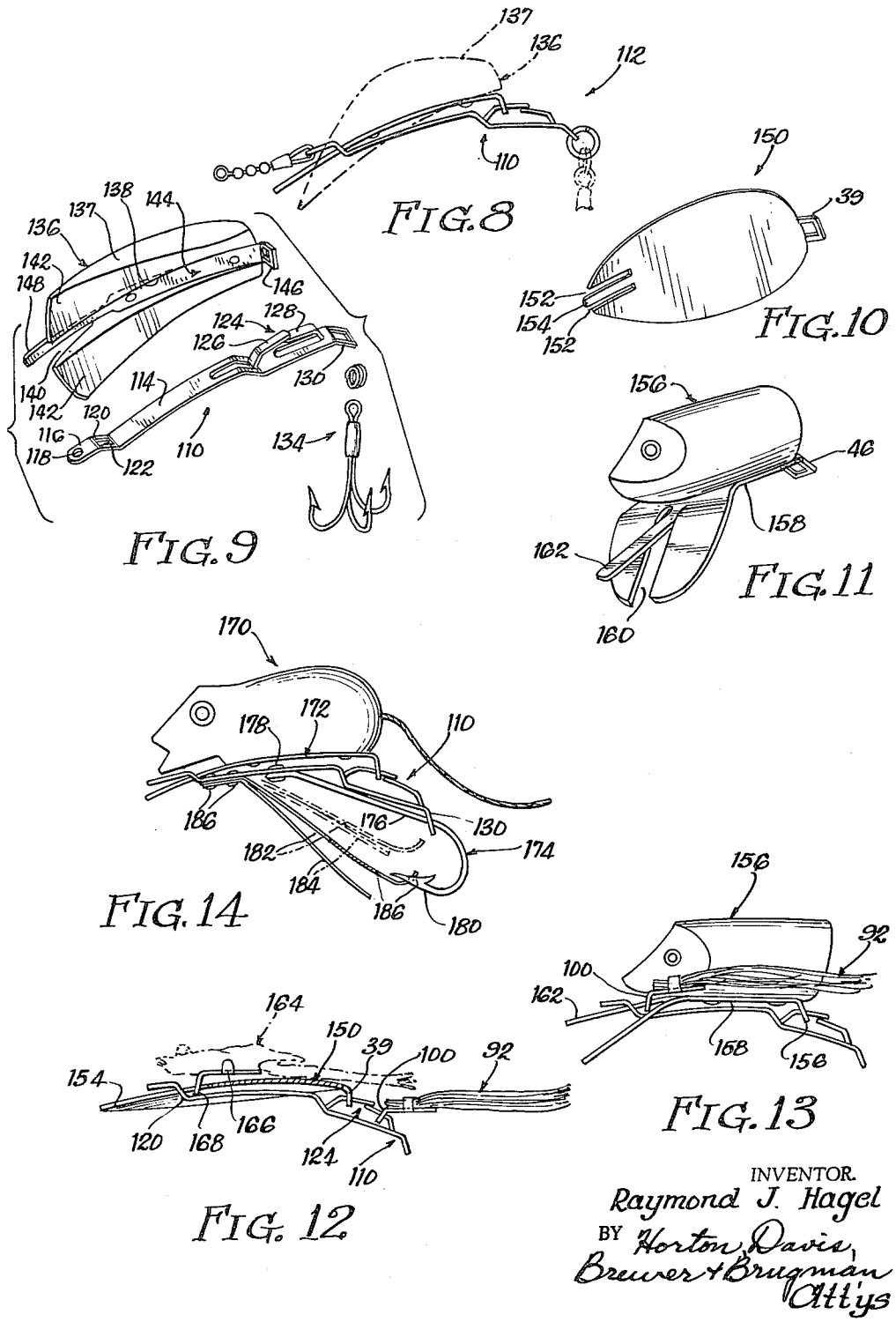

United States Patent Office 3,174,248
Patented Mar. 23, 1965

3,174,248
ARTIFICIAL FISH LURE
Raymond J. Hagel, 1200 N. Orange St., Peoria, Ill.
Filed June 11, 1963, Ser. No. 287,094
10 Claims. (Cl. 43—42.09)

The present invention relates to artificial fish lures.

The present invention is an improvement over the artificial fish lures disclosed and claimed in my prior Patent No. 3,059,372, dated October 23, 1962.

The present invention and that of my prior patent mentioned have to do with artificial fish lures of the type having separable bodies and hook assemblies so that various types, colors, and kinds of lure bodies can be conveniently carried for use with the same or different types of hook assemblies. A consideration taken into account in the invention of my prior patent mentioned, and the present invention, is that when a variety of artificial fish lures of the usual type having hooks attached thereto are carried in a tackle box, and unless a compartment is provided for each lure, the hooks of the different lures become entangled, so as to render use and interchange both slow and awkward. Furthermore, when hooks constitute permanent parts of each lure, many more lures must be carried to have a variety of hook types and arrangements, along with a variety of body types, colors and sizes. The construction of my prior patent mentioned, and of the present invention, include a body detachably mounted on a hook assembly.

A broad object of the present invention is to provide an artificial fish lure of the general character referred to, with improved construction simplifying the detachable mounting of the lure body on the hook assembly.

Another object of the invention is the provision of an artificial fish lure of the character referred to, in which the lure body and hook assembly are inter-connected at one end by a latching means and at the other end by a simple sliding fit, the lengths of the body member and hook assembly being such as to establish a detachable connection in which, when the latching means is latched, the members are prevented from becoming detached from one another at the other end where the sliding fit is established.

Another object of the invention is to provide an artificial fish lure of the foregoing character which is of very simple construction, and hence less expensive to manufacturers.

A still further object is to provide an artificial fish lure of the foreoging general character, including an alternate form of attaching bar in the use of which an extremely great number of combinations of lure bodies and accessory lure elements are made possible.

Another and more specific object is to provide a hook assembly of the general character noted, including a novel attaching bar of inexpensive construction.

A further object is to provide a novel weedless fish hook.

Other objects and advantages of the invention will appear from the following detailed description taken in conjunction with the accompanying drawings in which:

FIG. 1 is a side elevational view of an artificial fish lure embodying one form of my invention, and showing the lure with a leader for a fishing line attached thereto;

FIG. 2 is a longitudinal vertical sectional view through the lure of FIG. 1;

FIG. 3 is a perspective view of the hook assembly shown in FIG. 1;

FIG. 4 is a perspective view of the lure body shown in FIG. 1, taken from an under side;

FIG. 5 is a perspective view of a modified form of lure body;

FIG. 6 is a perspective view of another modified form of lure body;

FIG. 7 is a perspective view of a clamping device for use in attaching feathers, buck tails, or the like to the lure;

FIG. 8 is a side elevational view of a modified form of the artificial fish lure, including a different construction of lure body and attaching bar, showing the lure body in dot-dash lines;

FIG. 9 is an exploded perspective view of the components of the lure of FIG. 8;

FIG. 10 is a perspective view of a lure body cooperable with the attaching bar of FIG. 8;

FIG. 11 shows another form of lure body cooperable with the attaching bar of FIG. 8;

FIG. 12 is a side view, mainly elevational, but partially in section, of a lure of the invention incorporating the attaching bar of FIGS. 8 and 9, showing a representative combination of lure components;

FIG. 13 is a side elevational view of a lure, showing a different combination of components from that of FIG. 12; and FIG. 14 is a side elevational view of a lure including a novel weedless hook.

Referring now in detail to the accompanying drawings, attention is directed first to FIGS. 1 to 4, showing as an example one embodiment of the invention for illustrative purposes. The artificial fish lure indicated in its entirety at 10 includes two main parts, manually separable from each other, one of which is a lure body 12 and the other of which is a hook assembly 14. These two main parts, as will be explained more fully hereinbelow, are detachably connected together, and by reason of such detachability a wide variety of different shapes, kinds, types and colors of lure bodies can be utilized with hook assemblies having various types and combinations of hooks thereon. The various lure bodies can be stored together in a tackle box without having the hooks becoming entangled, since the hooks can removed from the bodies and stored separately when not in use. Also, a large variety of combinations is possible with the separable parts. The lure body 12 includes a main body portion 16 which may be so shaped and be of such size as to represent any desired real lure. The main body portion 16 may be of any desired material such as wood, suitably colored, or of a suitably colored molded plastic material.

Another consideration in selecting the shape of the lure body is that the body gives a lure action as it is pulled through the water, to produce an attraction to the fish. The lure body 16 has a main solid portion 18 and a portion 20 slotted as at 22, forming transversely spaced elements 24 which in the use of the lure are at the leading end thereof. In the present instance also, a groove 26 is formed in the under surface of the lure body from a point indicated at 28 adjacent to but spaced from the forward tips of the elements 24 through the opposite and rear end of the body. A body anchoring element 30 is secured on the rear end of the lure body, having a flat portion fitted in the groove 26 and secured thereto as by screw means 34. This anchoring element includes a closed loop or eyelet 36, preferably integral therewith, extending rearwardly beyond the body and downwardly therefrom. If desired, this anchoring element 30 may be of sheet metal, stamped and punched to the desired conformation.

In the modification shown in FIG. 5, a lure body 37, used in substitution for the body 12, is in the form generally referred to as a metal spoon. In this instance a main body portion 38 is stamped from sheet metal, and is usually curved from end to end longitudinally the body, and often is laterally curved, also. In this type of lure body, an anchoring loop 39 is made integrally with the main body portion 16, and is disposed at the rear of the body portion in the same relative position as the anchoring element 36, and serves a similar function, as described in detail hereinbelow. The forward end of the spoon body portion 38 of FIG. 5 is slotted longitudinally from the front end rearwardly as indicated by the slot 40 which corresponds to the slot 22 in the former modification.

In the further modification shown in FIG. 6, the lure body 41, replacing the body 12, includes a main body portion 42 that is readily distinguishable as a mouse. Secured to this main body portion is an anchoring element 43 secured to the under side of the main body portion by suitable means, such as screws or nails 44. At the rear end of this anchoring element, and preferably integral therewith, is a closed loop 46, which is disposed in a position corresponding to the closed loop 36 of FIG. 4 and serves the same function. The front end of the anchoring element 42 is bent downwardly, as indicated at 48, and may be of relatively enlarged transverse dimension. The anchoring element is slotted, as indicated at 50, from the forward and downward extremity of this bent portion upwardly and rearwardly into the longitudinal portion of the anchoring element, this slot in the assembled lure performing the same function as the slot 22 described above in connection with FIGS. 1 to 4.

The hook assembly indicated in its entirety 14 includes an attaching bar or member 52, which corresponds to the attaching bar 24 of my prior patent referred to above, but which differs from the member in several respects, and in connection with which a principal feature of the present invention is concerned. This attaching bar 52 is made of a flat strip or ribbon of metal such as steel, bronze or other material, the exact kind not being of the essence of the present invention, and is preferably of a continuous piece. This attaching bar includes a main central portion 54 and a lead portion 56 bent substantially at right angles thereto. An aperture 58 may be provided in the leading end of the lead portion 56 for securement of an eyelet 60 to which the line is secured. This eyelet 60 may be incorporated in a clasp 62 (FIG. 1), the opposite end of which is secured to a leader 64, a swivel 66 of conventional kind being incorporated between the leader 64 and the normal line 68 to prevent the action of the lure from twisting the line.

The attaching bar is shaped to provide a latching loop 69 at the rear end of the bar, to form which, the strip is bent on itself forming a rearwardly extending prong 72, this return bend portion being maintained in desired condition by suitable means, such as a rivet 74. The return bend portion is again return bent at 76 in rearward direction forming a segment 78 at the rear end of which is a closed loop or eyelet 80, this latter closed loop being formed by a similar return bend, the upper run 81 of which is secured to the lower segment as by a rivet 82. The extremity of this upper run forms a flexible latching element 84 detached at its extended end to form a clasp, being flexible downwardly for that purpose and self biased against the underside of the prong 72. A hook 86 which may be of any desired type such as a gang hook is secured in the closed loop 80 by suitable means such as a ring 88. If desired, additional hook or hooks such as shown at 90 may be mounted on the attaching bar 52 at an intermediate position, such as illustrated in FIG. 3, as by means of an eyelet 91 secured to the under side of the central portion 54 of the attaching bar.

To assemble the body 12 and hook assembly 14 together, the twisted lead portion 56 of the attaching bar is inserted in the slot 22 between the elements 24 and then moved rearwardly toward the base of the slot to a position just short of that indicated in FIG. 1, in which the closed loop 36 is disposed over the flexible latch element 84. The user then depresses the rear end of the body 16, and this closed loop 36 is thereby pushed against the latch element 84, the latter yielding under such pressure, and the bottom element of the loop enters into the latching loop, under the prong 72 and flexible element 84. The attaching bar and body may then be moved relatively to each other, the attaching bar rearwardly and the body forwardly to the position shown in FIG. 1.

Regardless of any tendency to relative longitudinal movement between the body and hook assembly, these two main parts are prevented from separation. Assuming one extreme position similar to that shown in FIG. 1 in which the body is disposed in its forward limit position, the body is retained on the attaching bar at one end by the loop 36 latched in the latching loop 69, and at the other end by contact engagement between the eyelet 60 and the elements 24, the eyelet 60 being disposed transverse to the plane of the slot. Considering the opposite limit position indicated in FIG. 2 in which the loop 36 is disposed at the rear end of the latching loop 69, separation at the opposite end is prevented also by the eyelet 60 engaging the elements 24. It will be appreciated that the relation between the lengths of the body and the attaching bar are such that regardless of the positions of the body relative to the attaching bar, the eyelet 60 remains within the limits of the elements 24, and the desired inter-connecting engagement between the body and the attaching bar at both ends is and remains established.

To manually remove the body from the attaching bar, the parts are first positioned as indicated in FIG. 1, whereupon the user depresses the latch element 84 and then moves the body rearwardly to move the loop 36 off of the prong 72 and out of the latching loop 69. That end of the body is then free of connection, and the body can be removed from the attaching bar by moving it to the right and upwardly, as oriented in FIG. 1, after rotating it, if desired, a slight amount in counterclockwise direction. Thus an extremely simple construction is provided for detachably interconnecting a lure body and hook assembly.

Another advantage realized in the present construction is that there are a minimum of points tending to catch volunteer matter, such as weeds, etc., in the water. For example, the latching means, including the prong 72 and the latching element 84, are arranged with the exposed, possibly snagging, point disposed rearwardly, i.e., the extended end of the prong 72 is disposed rearwardly, and any weeds or other material tending to snag would ride off of the latching means. The exposed leading surfaces of the body and the attaching bar where the latter extends through the slot 22 are relatively smooth, with a minimum tendency to snagging elements such as weeds.

The lure clamp means illustrated in FIG. 7 may be utilized for mounting supplemental lure elements, such as feathers, buck tails and the like, as indicated at 92 in FIG. 1, to the hook assembly. This clamp means 93 may be made of sheet metal, as by a stamping operation, and includes a flat portion 94 having a plurality of apertures 96 therein, side arms 98 and a loop 100 which may be bent downwardly out of the plane of the portion 94. In incorporating the additional lure elements 92 in this clamp element, a front portion 102 thereof is laid over the flat portion 94 of the clamp means, and the side arms 98 are bent and clamped thereover. This clamping action may be sufficient to hold the lure elements 92 in position, but if desired, additional elements such as wire, string, etc., may be passed through the apertures 96 and utilized for securing the lure elements in place. The loop 100 is clasped in the latching loop 69, and thus detachably latched to the lure.

Attention is next directed to FIGS. 8 to 13 inclusive, showing a modified form of attaching bar and cooperating lure bodies and lure elements utilized therewith. The present construction incorporates the same basic concept as in the first embodiment, namely, positive connection between the lure body and attaching bar at one end, a slip fit at the other end, with the relative lengths of the lure body and attaching bar such as to prevent accidental detachment or separation of those components due to relative sliding movement within the range of play provided. The present embodiment differs from the first embodiment in that a simpler and more effective construction is provided and greater combinations of attaching bar and lure bodies are made possible.

The attaching bar in the present embodiment is indicated in its entirety at 110, one or more hooks being connected thereto to form a hook assembly indicated in its entirety at 112. The attaching bar is made of a flat strip or ribbon of metal, such as stainless steel, and in the final assembly with the lure body is positioned with a flat side facing upwardly. The attaching bar includes a main central portion 114 and a lead portion 116 displaced upwardly therefrom, also with a flat side facing upwardly. An aperture 118 is provided in the lead portion 116 for securement of a leader thereto.

Between the central portion 114 and the lead portion 116 is an upwardly inclined segment 120 having a relatively large aperture 122 therein. This segment 120, as will be noted, includes a component of direction transverse to the main portion 114 and lead portion 116 for reception of an element of the lure body therethrough that continues in the general direction of the main central portion 114, as will be described in detail hereinbelow.

Rearwardly of the central portion 114 is a latching loop 124 similar in function to the latching hook 69 but different in detail construction. This latching loop includes a first prong 126 cut and struck from the body of the attaching bar and bent rearwardly from the main portion 114, and a second prong 128 also cut and struck from the material of the body of the attaching bar, and extending forwardly into overlapping relation with the prong 126. At least the prong 128 possesses a certain degree of flexibility to enable it to be depressed in attaching the lure body. The two prongs 126 and 128, as will be noted particularly in FIG. 8, lie in or near a rearward projection of the main portion 114, to facilitate latching of the lure body thereto as described below.

At the rear end of the attaching bar is a downwardly extending loop or eyelet 130 to which a hook 134 may be secured in any desired manner to complete the hook assembly referred to above. One or more hooks may be secured as desired, as in the case of the first embodiment, as indicated in FIG. 3.

The present embodiment of the invention includes a plurality of kinds of lure bodies and auxiliary lure elements making possible a wide range of combinations of those components with the attaching bar. Attention is directed first to FIGS. 8 and 9 which show a lure body 136 similar in overall shape to the lure body 12, but in the present instance the body portion 137 thereof is provided with a groove 138 in its under surface extending throughout most of its length and opening through the opposite surface at its leading end, forming a slot 140 and spaced elements 142. An anchoring element 144 in the form of a flat metal strip is secured in the groove by such means as rivets or nails, and this anchoring element has at its rear end, and at a position adjacent the rear end of the lure body portion 137, a downwardly turned loop or eyelet 146. The forward end of the anchoring element 144 is in the form of a tongue 148, preferably narrower than the main portion thereof. The groove 138 and particularly the slot portion 140 thereof is of sufficient width to receive the lead portion 116 and inclined portion 120 of the attaching bar therein, and the tongue 148 is sufficiently narrow to be received in the aperture 122. However, for convenience the remainder of the groove 138 may be the same width as the slot 140 and the main portion of the anchoring element 144 may be of that same width.

The lure body 136 is attached to the attaching bar by inserting the tongue 148 through the aperture 122 and then securing the rear end of the lure body in the attaching loop 124, by pressing the loop or eyelet 146 against the flexible prong 128 and thereby securing it in the attaching loop 124. It may be removed in a reverse manner, namely, by depressing the prong 128 and removing the loop 146 from the attaching loop, and then merely withdrawing the lure body from the attaching bar.

The relative lengths of the attaching bar and lure body and the inter-engaging components thereof are such that within the limits of movement of the loop 146 in the attaching loop 124, the tongue 148 at the forward end of the lure body remains in the aperture 122. This form of the invention thus possesses in common with the first embodiment the feature whereby the lure body is positively latched at one end and is secured at the opposite end through a sliding fit. However, in the present instance the lead portion 116 of the attaching bar is in the same general position relative to the remainder of the attaching bar, i.e., with a flat side disposed upwardly and correspondingly oriented elements, enabling a greater variety of kinds of elements to be attached to the attaching bar in combination with other lure elements.

Another form of lure body is illustrated at 150 in FIG. 10, which is in the form of a metal spoon similar to that of FIG. 5. The lure body or spoon 150 is provided with a pair of slots 152 at its leading end forming therebetween a tongue 154. This lure body may be attached to the attaching bar 110 in the same manner as described in connection with FIGS. 8 and 9, namely the tongue 154 is inserted through the aperture 122, the dimensions and spacing of the slots 152 being such as to enable such insertion of the tongue and to receive the side bounding portions of the aperture 122 in the slots, and the loop 39 is pressed downwardly into latching engagement with the latching loop 124.

The lure body 156 of FIG. 11 is generally similar in appearance to that of FIG. 6, but the anchoring element 158 instead of being provided with a single slot as in FIG. 6 is provided with a pair of slots 160, forming a tongue 162 therebetween, and this lure body is attached to the attaching bar as described above in connection with FIGS. 8–10.

Attention is now directed to FIGS. 12 and 13 showing different combinations of the attaching bar and lure bodies or lure elements. In FIG. 12 the spoon 150 is secured to the attaching bar 110 in the manner described above, namely—the tongue 154 is inserted through the aperture 122, and the loop 39 is secured in the latching loop 124. The bucktail 92 is also incorporated in the assembly, by securing the loop or eyelet 100 thereof in the latching loop 124 along with the loop 39 on the lure body. It will be observed that the latching loop 124 is of sufficient capacity to hold, not only the loops 39 and 100, but even additional ones, if it should be desired to attach additional elements to the attaching bar. An additional lure element 164 is also incorporated in the combination of FIG. 12. This lure element 164 may be, for example, a frog or similar element, and has an attaching element 166 secured to the frog by any suitable means, such as by a staple or clip, and a downwardly turned loop or eyelet 168 receiving the tongue 154 of the spoon. To attach the lure element 164 in the assembly, the loop 168 is first fitted on the tongue 154 before the spoon is fitted to the attaching bar, and thereafter the tongue 154 is inserted in the aperture 122 in the attaching bar. The loop 168 is then confined between the segment 120 of the attaching bar and the rear end surfaces of the slots 152 in the spoon, being thus allowed a limited amount of incidental movement thereon, depending upon the position of the spoon, forwardly or rearwardly relative to the attaching bar.

FIG. 13 illustrates the accommodation of another combination of elements. In this figure the lure body 156 is mounted on the attaching bar and the bucktail 92 is mounted in conjunction therewith, with the loop 100 thereof positioned on and receiving the tongue 162 of the lure body. The bucktail hairs can then flow or stream rearwardly beside the body member of the lure body.

An important feature of the present embodiment resides in the complete interchangeability of the lure elements and the positioning of them at various locations on the lure assembly. For example, the bucktail 92 can be secured either at the rear of the attaching bar or at the front of the assembly, and in the latter case in conjunction with a lure body. The same kind of attaching element in the form of the loop 100 on the bucktail or the loop 168 on the lure element 164 is utilized for this purpose to enable the lure elements to be attached at either of these locations. The attaching bar is shaped at the leading end to provide the aperture 122 to enable such incorporation of the lure elements at either of the two locations mentioned, and either singly or in conjunction with other lure elements or bodies. The arrangement enables a wide variety of lure bodies having tongue elements, such as 148, 154, or 162, of such construction as to cooperate with the aperture 122 in the attaching bar and the lure elements for attaching the latter thereon.

FIG. 14 illustrates a construction which includes an attaching bar having a weedless hook incorporated therein. In this combination the lure body 170 includes an anchoring element 172 similar, for example, to the corresponding element 144 of the lure body 136, and is mounted on the attaching bar 110 in a similar manner. Instead of a hook such as 134 of FIG. 9, a rigidly mounted hook 174 is utilized, having a shank 176 received in the loop 130 and its forward end secured to the attaching bar as by a rivet 178. The hook 174 includes a forwardly bent hook element 180. A pair of resilient spring leaf weed deflector elements 182 and 184 are incorporated in the assembly, together being secured to the attaching bar 110 by suitable means such as rivets 186. The two weed deflector elements 182 and 184 are self-biased downwardly and the element 182 has an aperture in its free end, the limits of which are indicated at 186. The free end of the element 182 is upwardly bent to receive the prong of the hook element 180 therein and the remote limit marginal edge of the aperture engages the hook element. The other element 184 is shorter and is normally spaced downwardly from the element 182. The element 184 functions to deflect weeds and other material from the hook element 180 to the limit of its resistance and upon yielding a sufficient extent engages the element 182, and these two elements together are operative for providing a substantial degree of resistance for deflecting weeds, exerting a high relative force thereon. However, these two elements 182 and 184 readily yield in response to a fish biting on the hook and move upwardly, as indicated by the dot-dash lines, exposing the hook for its normal function.

While I have shown herein certain preferred embodiments of the invention, it will be understood that changes may be made therein within the scope of the appended claims.

I claim:

1. An artificial fish lure comprising, in combination, a lure body of preselected shape and size, means at opposite end regions of said lure body and in predetermined spaced relationship to one another for providing fastening elements, one of said fastening elements comprising a closed loop extending downwardly from one end of the body, and the other fastening element comprising a slot extending longitudinally of the body from the front end thereof and located between and forming forwardly extending side elements, and a hook assembly releasably attachable to the lure body, said hook assembly including an attaching bar comprising an integral unitary strip of sheet stock having a hook secured thereto and depending downwardly therefrom, said attaching bar having front and rear lure body engaging regions disposed in transverse planes with respect to one another, and said attaching bar having at the rear end thereof a looped portion including overlapping separable latch parts normally biased into engagement with one another effectively to close said looped portion, the front portion of said attaching bar having at the front end thereof means to which a fishing line is attachable, said front portion of the attaching bar fitting non-rotatably in said slot in the lure body when said looped portion of the attaching bar is engaged with said closed loop on the lure body, and said attaching bar having a length greater than the distance between said slot and said closed loop on the lure body, and the distance between said closed loop on the lure body and the front ends of said forwardly extending side elements being greater than the distance between the rear end of said looped portion of the attaching bar and said means to which a fishing line is attachable, so that said means to which a fishing line is attachable is exposed at the front of the lure body when the attaching bar is engaged in said slot as aforesaid.

2. An artificial fish lure as defined in claim 1, and wherein said attaching bar comprises an integral strip of metallic ribbon having the rear regions thereof bent at selected positions to form said looped portion including overlapping separable latch parts.

3. An artificial fish lure, comprising in combination, a body having a closed loop at one end and a longitudinal slot extending inwardly from the other end, and a separate attaching bar having a thin end portion received in said slot and a normally closed, manually openable, latching loop at the other end releasably interconnected with said closed loop on the body, and means on the extended end of the attaching bar beyond said slot for attaching a fishing line to said bar, said fishing line attaching means being of greater width than the slot, the relative lengths of the body and attaching bar being such as to prevent withdrawal of said thin end portion from said slot notwithstanding relative movement between said body and attaching bar due to play in said latching loop and said closed loop on the attaching bar when those two elements are interconnected and said fishing line attaching means preventing withdrawal of the thin end portion of the attaching bar in one direction through said slot.

4. An artificial fish lure comprising, in combination, a body and a hook attaching bar made of a single unitary strip of sheet stock adapted for detachable connection together, and when so connected, together having a rear end and a front end, the body and hook assembly having at their rear ends interlinking loops one of which has an openable part to enable insertion and removal of the other, and the loops enabling limited relative longitudinal movement between the body and hook assembly when the loops are interlinked, and the body and hook assembly having at their front ends cooperating elements interengageable in response to relative longitudinal movement between the body and hook assembly to form an interconnection therebetween operative to prevent detachment in all directions other than longitudinal direction, and said cooperating elements having such length as to be so operative to prevent detachment throughout the range of said relative longitudinal movement between the body and hook assembly as limited by said interlinking loops.

5. An artificial fish lure as defined in claim 4, and wherein said attaching bar is in the form of a flat strip having a flat upper surface in all portions of which lines lying therein perpendicular to the length direction of the strip are parallel to each other, and further, wherein said attaching bar includes a segment adjacent its front end having a substantial upright component of direction in which an aperture is formed for the reception of a fish line.

6. An artificial fish lure as defined in claim 5, and wherein the attaching bar includes a central main portion determining a general direction of the bar and from which said segment extends upwardly, and a portion at the rear depressed from said central main portion, said loop on the attaching bar is formed from prongs struck from the body of the attaching bar and having their free ends overlapping, said loop on the rear end of the body extending generally downwardly.

7. An artificial fish lure as defined in claim 4, and wherein the attaching bar includes a second loop at its rear end behind said first-mentioned loop, and hook means is secured to the attaching bar with at least a portion thereof so secured by engagement thereof with said second loop.

8. An artificial fish lure as defined in claim 7, and wherein said hook means includes a shank having one end secured to the attaching bar and extending rearwardly through said loop and with a hook element extending forwardly under the attaching bar, and further, wherein resilient weed deflector means is secured to the attaching bar and self biased into operative weed deflecting engagement with the hook element.

9. Fish hook means comprising, a mounting member, a hook secured on the mounting member and having a forwardly extending hook element adjacent a rear end of the mounting member, and weed deflector means including a pair of spring leaves each having one end secured to the mounting member and its opposite and free end directed rearwardly into proximity with the hook element, both of the spring leaves being flexible upwardly to a position adjacent the mounting member and being self biased downwardly toward the hook element, one of the spring leaves having an aperture adjacent its free end and being of sufficient length to engage the hook element and be limited thereby to a position operative for deflecting weeds from the hook element, and the other spring leaf being sufficiently short to pass the hook element and being biased to a normal position below the hook element and spaced from the first mentioned spring leaf.

10. An attaching bar for use in conjunction with a fish lure body, comprising a unitary flat strip having an opening at its front end for the attachment thereto of a fishing line, said strip being twisted substantially ninety degrees near its front end, then folded downwardly upon itself at a point removed from said twist, then bent downwardly and rearwardly into a U shape, then bent upwardly and forwardly into contact with itself to form a loop for the attachment thereto of a fishing hook, and lastly bent upwardly and forwardly to bring its other end under the fold with a resilient bias to form a snap hook for attachment of the bar to a fish lure body.

References Cited by the Examiner
UNITED STATES PATENTS 2,570,100  10/51  Collins _____ 43—42.09
3,059,372  10/62  Hagel _____ 43—42.09

ABRAHAM G. STONE, *Primary Examiner.*